Jan. 7, 1964     A. L. HUBBARD     3,116,584

COTTON HARVESTER DRIVE MECHANISM

Filed Dec. 26, 1961     2 Sheets-Sheet 1

INVENTOR.
A. L. HUBBARD
BY William A. Murray
ATTORNEY

Jan. 7, 1964  A. L. HUBBARD  3,116,584
COTTON HARVESTER DRIVE MECHANISM
Filed Dec. 26, 1961  2 Sheets-Sheet 2

INVENTOR.
A.L. HUBBARD
BY William A. Murray
ATTORNEY

United States Patent Office 3,116,584
Patented Jan. 7, 1964

3,116,584
COTTON HARVESTER DRIVE MECHANISM
Arthur L. Hubbard, Des Moines, Iowa, assignor to Deere & Company, Moline, Ill., a corporation of Delaware
Filed Dec. 26, 1961, Ser. No. 161,816
12 Claims. (Cl. 56—44)

This invention relates to a drive mechanism for a cotton harvester. More particularly this invention relates to a tripping mechanism associated with the harvesting mechanism effecting the disengagement of the power between the main drive source and the harvesting mechanism upon an overload being applied on the harvesting mechanism.

The conventional type of cotton harvester is composed of a housing structure defining a fore-and-aft extending plant passage which receives the plants of a cotton row when the harvester is moved forwardly. Harvesting mechanism is mounted internally of the housing and is normally composed of an upright cotton harvesting drum having laterally extending picking spindles which move into the passage and harvest the cotton bolls from the plants. The spindles are disposed in vertical rows and are mounted on an upright drum which rotates about a vertical axis. Consequently there are two motions or actions of the spindles, the first being a rotation of the spindles about their own axes and the second being a movement of the spindles about the drum axis.

It is desirable to rotate the drum about its axis so that the spindles will move through the plant passage at substantially the rate of forward movement of the harvester over the ground. Such a driving arrangement is shown in U.S. Patent 2,721,436 which issued to Mr. A. L. Hubbard October 25, 1955. In the drive there shown there are provided a series of vertical upright spindle drive shafts for each vertical row of spindles. Each spindle drive shaft is geared to the spindles and has at its upper end a planet gear. Each of the planet gears on the spindle drive shaft is driven by a central sun gear supported on the drum shaft. The sun gear is driven by a main power source so that all of the spindles are driven in unison. There is further provided in the Hubbard patent a separate drive for the drum shaft which positively drives the spindles about the drum axis at the ground speed of the harvester. A problem with this type of drive is that there is no protection for the spindles and drum should an obstruction be passed into the plant passage or in the path of the spindles. There have been some improvements on this type of drive which permit the planetary gearing arrangement of the spindles to operate to drive the spindle drum. In this latter arrangement, should the obstruction move through the plant passage, the spindles will merely speed up in their rotation since the drum will be prevented from rotating. Such an improvement is shown and described in U.S. Patent 2,821,832 which issued to J. Markoski, February 4, 1958. However, in the latter improvement, the drive to the harvesting mechanism is not shut off and the spindles will rotate at a very high rate of rotation and with certain types of obstructions in the plant passage, considerable harm and damage may be done to the spindles.

With the above in mind, it is the main purpose of the present invention to incorporate in a planetary type drive for the picking spindles on the drum, a positive shut off or tripping device to the main power source of the cotton harvester which will operate, upon an obstruction moving into the passage or about the harvester drum, to completely demobilize or shut off the power source to the harvesting mechanism. The present invention will operate upon the theory that the drum will rotate due to the reactive force between the sun gear and the planet gears which operate to rotate the individual spindles. Should an obstruction be applied to the spindles in the passage or housing, the drum will tend to rotate at a slower rate. Upon the drum moving at this slower rate, it is the purpose of the present invention to trip the drive mechanism to the harvester.

Other objects and advantages of the present invention will become apparent to those skilled in the art as the nature of the invention is better understood from the following disclosure and as shown in the accompanying drawings.

Figure 1:
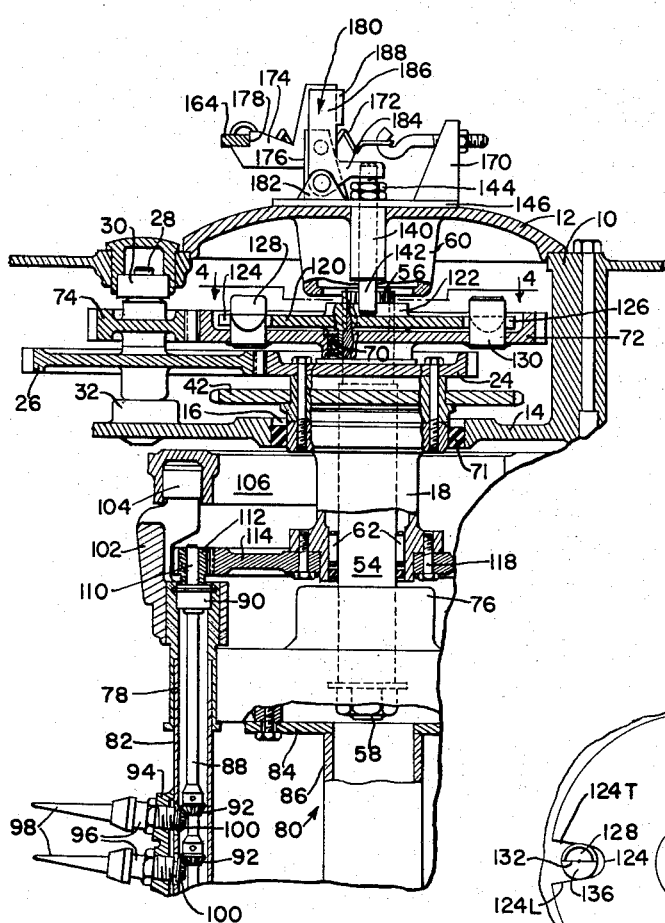
FIG. 1 is a vertical sectional view of the upper end of a cotton harvesting mechanism and is showing a portion of the trip mechanism.
Figure 3:
FIG. 3 is a perspective view of a portion of the tripping mechanism.

The picker construction fundamentally involves some kind of a support, which includes a secondary support in the form of a lubricant containing housing 10 having a top wall or cover 12 and a bottom wall or floor 14. The bottom wall or floor has a circular opening 16 therein for accommodating a vertical sleeve 18. This sleeve has an upper part within the lubricant containing compartment of the housing 10 and a lower part below the housing floor 14. The upper part of the sleeve 18 has secured thereto an input member in the form of a gear 24 in constant mesh with an intermediate gear 26. The gear 26 is keyed to a short shaft 28 journaled at its opposite ends in bearings 30 and 32 respectively in the cover 12 and floor 14 of the housing or support 10.

Figure 7:
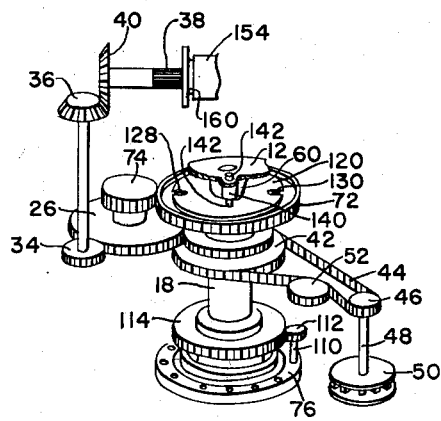
FIG. 7 is a schematic view showing the drive to the harvesting mechanism.

As illustrated schematically in FIG. 7, the secondary or intermediate gear 26 is in constant mesh with a driving pinion 34 which is rigid or unitary with an input beveled pinion 36. A driving or power shaft 38 has keyed thereto a beveled pinion 40 which is in constant mesh with the input pinion 36. There is also secured to the upper part of the sleeve 18 a doffer driving sprocket 42 about which is trained a chain 44 to drive a sprocket 46 keyed to the upper end of a vertical doffer shaft 48. The shaft 48 carries thereon a vertical series of doffers such as shown at 50 in FIG. 7. An idler sprocket 52 completes the drive from the sprocket 42 to the doffer shaft 48.

The sleeve 18 loosely surrounds or is concentric with a vertical drum shaft 54 which has a splined upper part 56 and a lower part 58 at a level considerably below the lower end of the sleeve 18. Above the upper part 56 of the drum shaft 54 is a smooth end, shown only partially at 57 in FIGS. 1 and 2, appropriately journaled in a bearing, indicated by its housing 60, rigid with the cover 12 of the housing or support 10. An intermediate part of the drum shaft is journaled by a bearing 62 at the lower part 22 of the sleeve 18.

In addition to the bearings 60 and 62 a third bearing 70 is installed between the gear 24 and the upper terminal portion of the drum shaft 54. Since the housing or support 10 is adapted to contain lubricant for lubricating the gears already described and additional ones to be presently described, a suitable lubricant seal 71 fits within the opening 16 in the housing floor 14 and surrounds the intermediate portion of the sleeve 18. The upper end of the drum shaft 54 has journaled on the bearing 70 a restraining gear 72 which is in constant mesh with an idler 74 keyed to the short shaft 28. Since the idlers 26 and 74 are both driven from the input gear 34 and since the two idlers are of different diameter and the gears 24 and 72 are of different diameters, the shaft 54 and sleeve 18 will have different speeds of rotation.

The lower part 58 of the shaft 54 has connected thereto in any appropriate manner the hub portions of a drum head 76 and the head and shaft together form a drum element. The head is generally circular as viewed from above and is, of course, coaxial with the drum shaft 54. The outer peripheral portion of the drum head is formed of a plurality of circular series of bearings 78 respectively on vertical axes and generally horizontally coplanar. As will be seen, the drum head 76 is spaced below the lower part of the sleeve 18.

The drum head 76 is part of a drum unit, designated generally by the numeral 80, including cotton picking mechanism having a plurality of hollow columns 82 journaled respectively at upper end portions thereof in the bearings 78 of the drum head. The underside of the drum head 76 carries a circular plate 84 to which is welded an upright tubular shaft 86. The lower end of the shaft is carried in appropriate structure for supporting the drum unit for rotation about the common axis of the drum shaft 54 and sleeve 18.

Details of the lower mounting for the shaft 86 are of no importance here and consequently are omitted.

Each column 82 encloses an upright spindle driving shaft 88 and each shaft is journaled adjacent an upper portion thereof by any suitable bearing as indicated at 90. Each of the shafts 88 has keyed thereto a plurality of vertically spaced beveled pinions 92. Each column 82 has a plurality of vertically spaced side openings over each of which is rigidly supported a spindle carrier 94. There are, of course, as many carriers 94 as there are beveled pinions 92. Normally there would be a considerable number of carriers to each column, ranging in conventional harvesters from 10 to 16 per drum unit.

Each of the spindle carriers 94 receives a spindle bearing 96 within which is journaled a generally radially outwardly projecting cotton picking spindle 98. The inner end of each spindle has thereon a beveled pinion 100 in constant mesh with the driving pinion 92 on the associated spindle driving shaft 88. This construction is largely conventional and to the extent that the present disclosure differs in detail from other designs, distinctions are immaterial for the present purposes.

The upper end of each column 82 projects somewhat above the drum head 76 and has keyed thereto a crank 102 on the free end of which is journaled a roller 104 which follows a cam track 106 in a plate 108 fixed to the under portion of the housing or support 10. The details of the representative structure are not important here and may be gained from an examination of the Hubbard patent referred to above. Since the cam track 106 is of a different shape than and is offset from the circle from which lies the axis of the spindle driving shaft 88, the spindle columns 82 will be caused to oscillate about the vertical axes of the bearings 78 as the entire drum unit 80 rotates about the axis of the drum shaft 54. This motion will cause the spindles 98 to assume different positions as they move into and out of the plant rows and through the associated doffers 50, all as is generally conventional.

Each of the spindle driving shafts 88 has an upper part 110 that projects above the upper end of its columns 82. This part may be said to include a drivable member or portion in the form of a small pinion 112 and all the pinions 112 are coplanar in a horizontal plane above the drum head 76 and below the floor 14 of the support or housing 10. These pinions are in constant mesh with a relatively large driving gear 114 which constitutes a driving member for rotating the spindle shafts 88 via the pinions 112. This driving member is fixed to the driving sleeve 18 by means of a plurality of cap screws 118. Since the drum shaft 54 and driving member comprising the sleeve 18 and gear 114 are driven by separate input numbers (72 and 24, respectively), and since the speeds of rotation are different it will be seen that the drum unit 80 will rotate about the common axis of the sleeve 18 and drum shaft 54 and that the gear 114 will drive the spindle shaft 88 as the drum rotates. However, due to the resistance or force created between the meshing gears 92, 94 and the gear 114 and gears 112, there will be a reactive or differential force on the header 76 which will cause the header 76 and the shaft 54 to rotate. Unless otherwise restricted or driven, the rate of rotation of the shaft 54 will be somewhat dependent upon the resistance to rotation of the spindles 98 as well as the resistance created in the plant passage or within the path of the spindles as the drum rotates.

However, even further it should be recognized that in normal operation of the cotton harvester the resistance to rotation of the spindles by the cotton plants and the fibers as well as resistance of the drum to rotation is of substantially negligible quantity and may be compensated for in the natural course of gear arrangements from the input sprocket 26 through the beveled gears 92, 94. The purpose of the present invention is to overcome the abnormally large loads which might occur on the spindles themselves or against the spindles if an abnormally large quantity of material or a foreign object would pass in the path of the spindles 98.

Figure 4:
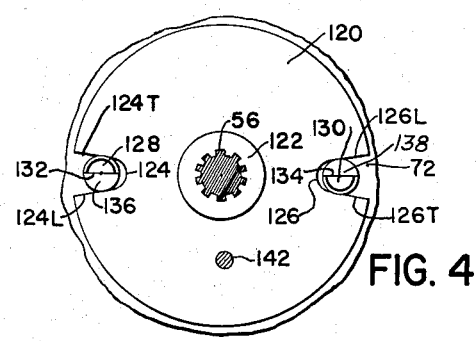
FIG. 4 is a sectional view taken substantially along the line 4—4 of FIG. 1.

A circular plate 120 has a hub 122 internally splined to move axially on the upper splined end 56 of the shaft 54. The plate 120 lies closely adjacent the flange of the gear 72, being recessed to permit close relation between the flange and the plate 120. A pair of notches 124, 126 open to the edges of the plate 120. A pair of pins or lugs 128, 130 are fixed to the web of the gear 72 and extend upwardly into the notches 124, 126. The pins 128, 130 are notched, as at 132, 134 and have downwardly inclined surfaces 136, 138 extending from the central portion of the respective pins to the outer peripheral surface. As viewed in FIGS. 4 and 5, the plates in the respective drums will rotate in a counterclockwise direction and consequently the surfaces 136, 138 extend to the leading surface of the pins 128, 130 as respects the direction of rotation.

The gear 74 and gear 72 are driven at a rate of rotation generally in synchronism with the ground speed of the implement over the ground. The gear 72 is journaled to the shaft 54 and consequently has no driving force on the shaft unless through the lugs 128, 130, the latter occurring through contact with the plate 120 which is splined to the shaft 54. As may be recalled, the spindles 98 are moved around the drum substantially at the ground speed of the implement over the ground. The entire drive from the gear 26 to the spindles 98 is such that in normal operation of the harvester the spindles will move at the ground speed. However, should for some reason the spindles tend to move at a greater speed than the ground speed of the implement, trailing edges 124T, 126T of the notches 124, 126 will contact the back or trailing surfaces of the pins 128, 130 and be retarded to the speed of the gear 72. Consequently the gear 72 operates as a retarding force to movement of the spindles 98 at a greater speed than ground speed. It is, however, primarily for the purpose of reducing damage should the spindles be unable to move at ground speed, that the present invention is developed.

Figure 2:
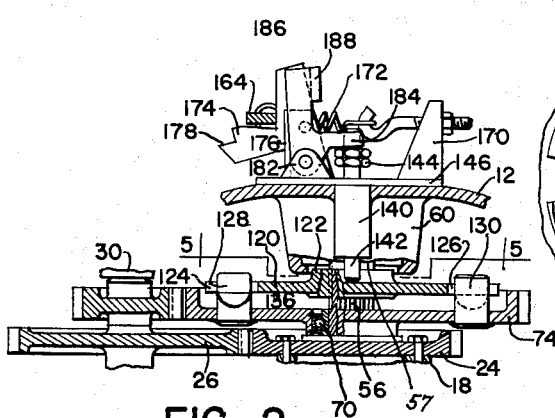
FIG. 2 is a view similar to FIG. 1 but showing even a smaller portion of the drive mechanism and tripping mechanism and further distinguishing since it shows the tripping mechanism in its trip position.
Figure 5:
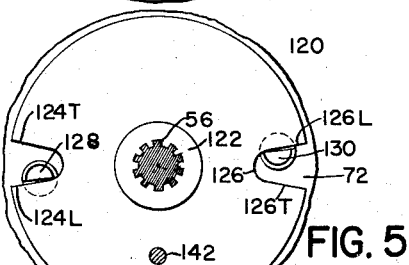
FIG. 5 is a sectional view taken substantially along the line 5—5 of FIG. 2.

Should the spindles 98 be retarded so that they do not move at ground speed, for example, when a large foreign object is in the passage, the drive to the spindles 98 would have a reactive effect on the spindles so that the spindles themselves rotate at a greater rate about their own axes and consequently accommodate the dragging or lagging rotation of the drum about its axis. Should, however, the drum tend to drag in its rate of rotation, the plate 120 and specifically the leading edges 124L and 126L will engage the surfaces 128 and 130 and move upwardly. Such a relation is shown in FIGS. 2 and 5.

The cover plate 12 has a depending boss 140 carrying a plunger 142, the lower end of which rides on the surface of the plate 120. The upper end of the plunger 142 is threaded to receive a pair of adjusting nuts 144. The upper end also extends above the surface of the cover 12 and extends through a plate 146 which lies on the surface of the cover 12.

Figure 6:
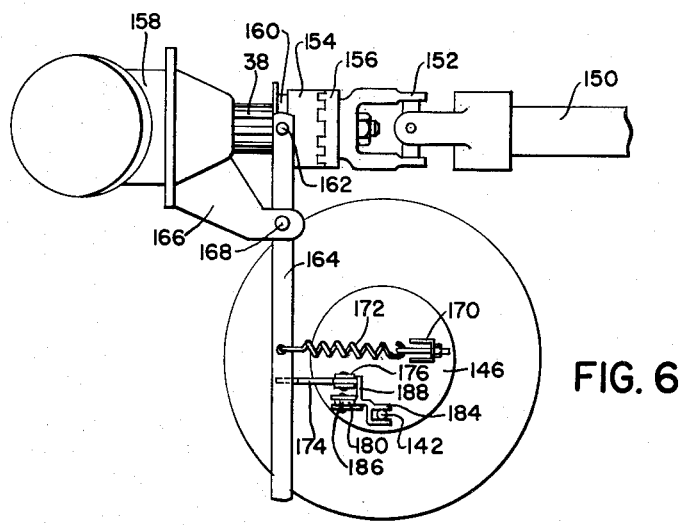
FIG. 6 is a plan view of the drive from the main power source to the harvester and also showing a portion of the tripping mechanism.

Referring to FIG. 6 for the moment, the shaft 38 is connected to a main power source or drive shaft 150 of the implement by means of a universal joint 152. The shaft 38 is splined to have slidably mounted thereon a first part 154 of a jaw clutch, a second part 156 being fixed to one portion of the universal joint 152. For purposes of orientation, the shaft 38 extends into a transmission housing 158 which contains the previously mentioned beveled gears 36, 40. The jaw clutch part 154 has an annular slot 160 which receives a pin 162 that connects a control lever 164 thereto. The lever 164 may be of a yoke type having opposite legs disposed on opposite sides of the jaw clutch part 154. This is, however, more or less a conventional design and it is not believed necessary to describe in detail the lever 164. The housing 158 has an outwardly projecting bracket portion 166 carrying a vertical pivot, such as at 168 on which is mounted a midportion of the lever 164. The jaw clutch 154, 156 may be engaged or disengaged by adjustment of the lever 164 about the pivot 168. Mounted on the plate 146 is an upwardly projecting bracket structure 170 which carries a coil spring 172 connected to the outer end of the lever 164. Unless otherwise restricted, the spring 172 normally exerts force on the lever 164 so as to disengage the jaw clutch part 154 from the part 156.

A first bell crank member 174 is supported on upwardly projecting brackets 176 rigid with the upper surface of the plate 146. The bell crank 174 has a forwardly directed leg portion with a notch 178 therein that receives the lever 164 and generally locks, as is shown in FIGS. 1 and 6, the jaw parts 154, 156 in their engaged position. As is clearly evident, counterclockwise movement of the bell crank 174 will cause disengagement of the notch 178 with the lever 164, and the spring 172 will cause disengagement of the jaw parts 154, 156. A second bell crank 180 is supported adjacent to but outwardly of the first bell crank member 174 on upwardly projecting lugs 182 also fixed to the upper surface of the plate 146. A rearwardly projecting leg portion 184 is bifurcated so as to embrace the upper end of the plunger 142. A vertical leg 186 of the bell crank 180 has a transversely extending lug 188 extending behind the vertical leg of the bell crank 174. The rearwardly projecting leg 184 of the bell crank 180 normally lies adjacent the top surface of the nuts 144 on the plunger 142.

As previously discussed, should the spindles 98 be prevented in any manner in retaining a movement substantially equal to the ground speed of the implement, the plunger 142 will be driven upwardly by the plate 120. The nuts 144 will then move the bell crank 180 in a counterclockwise direction which will cause the lug 188 to drive the bell crank 174 to a position in which the notch 178 is out of engagement with the lever 164. This will cause the lever 164 to be biased rearwardly or into a position in which the jaw clutch parts 154, 156 are disengaged. Thus, upon a retardation of the lateral movement of the spindles 98, the drive to the entire harvesting mechanism is demobilized and complete operation of all driven units of the harvester is stopped.

While only one form of the invention has been shown it should be recognized that other forms and variations will occur to those skilled in the art. Therefore, it should be understood that the present disclosure was made in detailed manner for the purposes of clearly and concisely illustrating the principles of the invention and was not intended to narrow or limit the invention beyond the broad concept set forth in the appended claims.

What is claimed is:

1. A drive for an upright cotton harvesting mechanism having laterally extending picking spindles supported on a drum rotatable about an upright axis, and having an upright drum shaft on the axis, the improvement comprising: a main power source; a reactive drive between the main power source and harvesting mechanism effecting a pre-determined normal rate of rotation of the spindles on the drum and a normal rate of rotation of the drum about its axis, but effective to react to an abnormal load on the spindles to reduce the rate of rotation of the drum below said normal; a pair of radial members on the drum shaft, one being fixed to rotate with the shaft and the other being mounted to rotate relative to the shaft; a drive between the main power source and the other of the members effecting rotation of the latter in synchronism with the normal rate of rotation of the drum; means interconnecting the radial members effecting a separation of the members upon movement out of synchronism with one another; a tripping device extending between the power source and the members for disengaging the power source, and effective upon separation of the members to create the disengagement.

2. A drive for an upright cotton harvesting mechanism having laterally extending picking spindles supported on a drum rotatable about an upright axis, the improvement comprising: a main power source; a reactive drive between the main power source and harvesting mechanism effecting a predetermined normal rate of rotation of the spindles on the drum and a normal rate of rotation of the drum about its axis, but effective to react to an abnormal load on the spindles to reduce the rate of rotation of the drum below said normal; a pair of radial members on the drum, one being fixed to rotate with the drum and the other being mounted to rotate relative to the drum; a drive between the main power source and the other of the members effecting rotation of the latter in synchronism with the normal rate of rotation of the drum; means interconnecting the radial members effecting a separation of the members upon movement out of synchronism with one another; a device extending between the power source and the members for disengaging the power source, and effective upon separation of the members to create the disengagement.

3. A drive for an upright cotton harvesting mechanism having laterally extending picking spindles supported on a drum rotatable about an upright axis, the improvement comprising: a mobilizable and demobilizable power source; a drive between the power source and harvesting mechanism normally effecting a normal rate of rotation of the drum about its axis but effective to react to an abnormal load on the spindles to reduce the rate of rotation of the drum below said normal; a pair of radial members on the drum, one being fixed to rotate with the drum and the other being mounted to rotate relative to the drum; a drive between the power source and the other of the members effecting rotation of the latter in synchronism with the normal rate of rotation of the drum; means interconnecting the radial members effecting a separation of the members upon movement out of synchronism with one another; a device extending between the power source and the members effective upon separation of the members to demobilize the power source.

4. A drive for an upright cotton harvesting mechanism having laterally extending picking spindles supported on a drum rotatable about an upright axis, the improvement comprising: a mobilizable and demobilizable power source; a drive betewen the power source and harvesting mechanism normally effecting a normal rate of rotation of the drum about its axis but effective to vary the rate of rotation of the drum away from said normal; a pair of members, one being mounted to rotate in synchronism with the drum; a drive between the power source and the other of the members effecting rotation of the latter in synchronism with the normal rate of rotation of the drum; a device between the power source and the members effective upon the members being out of synchronism to demobilize the power source.

5. A drive for an upright cotton harvesting mechanism having laterally extending picking spindles supported on a drum rotatable about an upright axis, the improvement comprising: a mobilizable and demobilizable power source; a drive between the power source and harvesting mechanism normally effecting a normal rate of rotation of the drum about its axis but effective to vary the rate of rotation of the drum away from said normal; a member; a drive between the power source and the member effecting rotation of the latter in synchronism with the normal rate of rotation of the drum; a device between the power source and the member effective upon the member and drum being out of synchronism to demobilize the power source.

6. A drive for a cotton harvesting mechanism having laterally extending picking spindles supported on a drum rotatable about an upright axis, the drive comprising: a mobilizable and demobilizable power source; a drive between the power source and harvesting mechanism effecting a pre-determined normal rate of rotation of the drum about its axis, but effective to react to abnormal conditions to vary the rate of rotation relative to said normal; a radial member rotatably mounted on the drum; drive means effecting rotation of the member in synchronism with the normal rate of rotation of the drum; and means extending between the power source and the member for demobilizing the power source upon the member and drum being out of synchronism.

7. A drive for a cotton harvesting mechanism having laterally extending picking spindles supported on a spindle support movable about an upright axis, the drive comprising: a mobilizable and demobilizable power source; a drive between the power source and harvesting mechanism effecting a pre-determined normal rate of movement of the spindle support about its axis, but effective to react to abnormal conditions to vary the rate of movement relative to said normal; a member associated with the spindle support; drive means effecting movement of the member in synchronism with the normal rate of movement of the spindle support and means extending between the power source and the member for demobilizing the power source upon the member and spindle support being out of synchronism.

8. A drive for an upright cotton harvesting drum having laterally extending picking spindles and rotatable about an upright axis, comprising: a mobilizable and demobilizable power source; a reactive drive between the power source and harvesting mechanism effecting a predetermined normal rate of rotation of the spindles on the drum and a normal rate of rotation of the drum about its axis, but effective to react to an abnormal load on the spindles to reduce the rate of rotation of the drum below said normal; a pair of radial members, one being fixed to rotate with the drum and the other being mounted to rotate relative to the drum; a drive between the main power source and the other of the members effecting rotation of the latter in synchronism with the normal rate of rotation of the drum; means between the radial members sensing out of synchronous motion between the members; a device extending between the power source and the sensing means for demobilizing the power source in response to the members being out of synchronism.

9. A drive for an upright cotton harvesting drum having laterally extending picking spindles and rotatable about an upright axis, comprising: a mobilizable and demobilizable power source; a reactive drive between the power source and harvesting mechanism effecting a pre-determined normal rate of rotation of the spindles on the drum and a normal rate of rotation of the drum about its axis, but effective to vary the rate of rotation of the drum away from said normal; a radial member mounted to rotate relative to the drum; a drive between the main power source and the member effecting rotation of the latter in synchronism with the normal rate of rotation of the drum; means between the radial member and the drum sensing out of synchronous motion therebetween; a device extending between the power source and the sensing means for demobilizing the power source in response to the member and drum being out of synchronism.

10. A drive for an upright cotton harvesting drum having laterally extending picking spindles rotatable about an upright axis and having an upright support on the axis rotatable in unison with the drum; the improvement comprising: a mobilizable and demobilizable power source; a reactive drive between the power source and harvesting mechanism effecting a pre-determined normal rate of rotation of the spindles on the drum and a normal rate of rotation of the drum about its axis, but effective to react to an abnormal load on the spindles to reduce the rate of rotation of the drum below said normal; a pair of adjacent radial members, one being rigid with the drum and the other being mounted on the support to rotate relative to the drum; a drive between the power source and the other of the members effecting rotation of the latter in phase with the normal rate of rotation of the drum; an element extending between the radial members effecting a one-way lock between the members to prevent the drum rotating faster than normal and an axial movement between the members upon the members moving out of synchronism with one another; and a device extending to the power source responsive to axial movement between the members to demobilize the power source.

11. A drive for an upright cotton harvesting mechanism having laterally extending picking spindles and rotatable about an upright axis and having an upright support on the axis rotatable in unison with the drum; the improvement comprising: a mobilizable and demobilizable power source; a reactive drive between the main power source and harvesting mechanism effecting a pre-determined normal rate of rotation of the spindles on the drum and a normal rate of rotation of the drum about its axis, but effective to react to an abnormal load on the spindles to reduce the rate of rotation of the drum below said normal; a pair of radial members; one being rigid with the drum and the other being mounted on the support to rotate relative to the drum, and one of the members having an inclined surface engageable with the other member for creating axial movement between the members upon their rotating out of synchronism with one another; a drive between the power source and the member mounted for rotation effecting rotation of the latter in synchronism with the normal rate of rotation of the drum; and a tripping device extending between the power source responsive to axial movement between the members to demobilize the power source.

12. A drive for an upright cotton harvesting mechanism having laterally extending picking spindles supported on a drum rotatable about an upright axis, the improvement comprising: a mobilizable and demobilizable power source; a drive between the power source and harvesting mechanism normally effecting a normal rate of rotation of the drum about its axis but effective, unless otherwise restricted, to vary the rate of rotation of the drum above and below the normal; a member; a drive between the power source and the member effecting rotation of the latter in synchronism with the normal rate of rotation of the drum; a connection between the member and drum for limiting the maximum rate of rotation of the drum substantially at the normal rate; and a device responsive to the drum and member rotating out of synchronism to demobilize the power source.

References Cited in the file of this patent
UNITED STATES PATENTS

| | | |
|---|---|---|
| 2,821,832 | Morkoski | Feb. 4, 1958 |
| 3,005,303 | Hubbard | Oct. 24, 1961 |